Nov. 27, 1951     E. C. LANE     2,576,795
FISHHOOK
Filed May 19, 1947
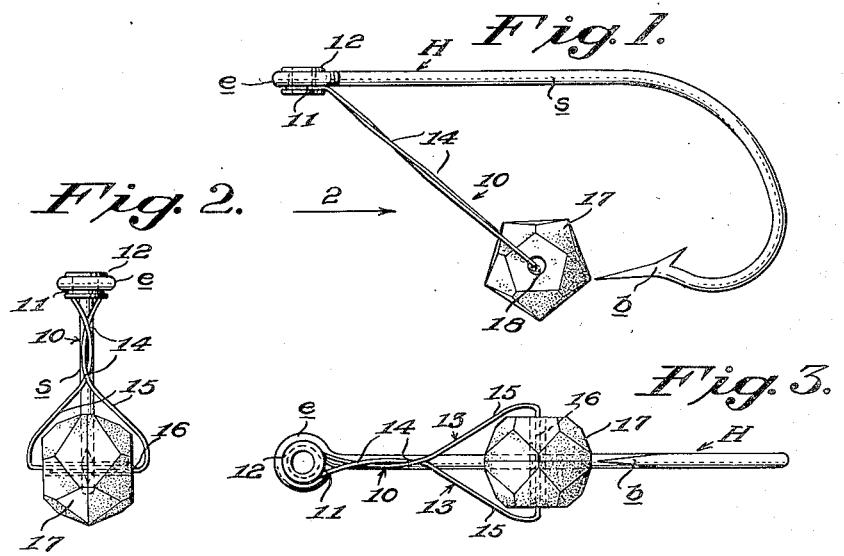
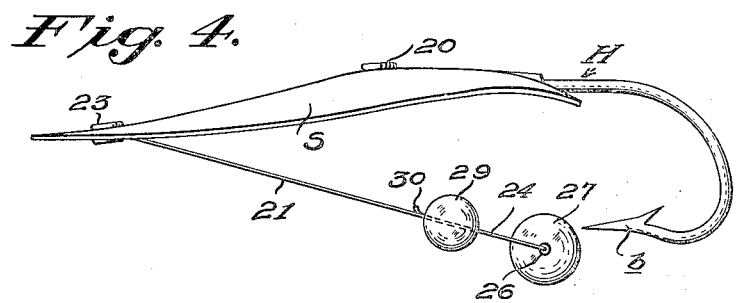
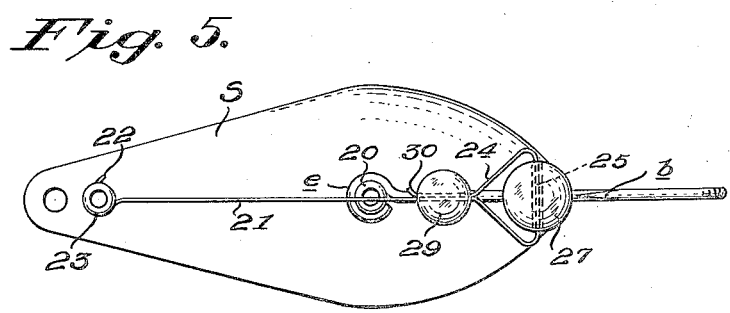
INVENTOR.
Edwin C. Lane
BY Patented Nov. 27, 1951

2,576,795

UNITED STATES PATENT OFFICE 2,576,795

FISHHOOK

Edwin C. Lane, Wyoming, N. Y.

Application May 19, 1947, Serial No. 748,911

2 Claims. (Cl. 43—43.4)

This invention relates to fish hooks.

The invention is more particularly concerned with a fish hook having a guard and bait flexibly connected thereto and disposed adjacent the barb of the hook for preventing catching of the barb in weeds or the like during casting or still fishing.

It is appreciated that devices of this kind have heretofore been proposed in the provision of a guarded hook barb, and such have assumed various forms of construction, such, for example, as a wire fastened adjacent one end thereof to the eye of the hook and having its free end disposed adjacent the barb of the hook.

Such prior constructions further included cork floats on the free end of the wire, and still others included a cork roller on the free end of the wire.

These various proposed prior constructions, however, did not fulfill the maximum requirements of devices of this kind, for the following reasons. The individual wire failed to provide a sufficient guard against catching of the hook barb in weeds and the like, due to its small dimensions and the ease of deflection when engaged by weeds and the like.

With the use of a float fixed to the free end of a flexible wire, the float itself was liable to catch in weeds and thereby be deflected away from the barb, with the result that the barb became ensnarled in the weeds.

The prior constructions including a cork roller on the free end of a flexible wire would appear to more nearly meet the requirements of devices of this kind, but in the prior proposed structures the roller was not disposed in such relation to the hook barb as to effectively guard same against catching in the weeds.

A primary object of this invention is the provision of a fish hook having a weed guard associated therewith in such manner as to effectively prevent the barb of the hook from catching in weeds or the like while, at the same time, permitting fish to strike at the hook.

A still further object of the invention is the provision of a device of the above noted character which, in addition to functioning as an efficient hook barb guard, also has the characteristic of simulating bait, thereby attracting fish to the hook.

Other objects and advantages of the invention will become apparent in the course of the following detailed description, taken in connection with the accompanying drawing, wherein—

Figure 1 is a side elevational view of one embodiment of the invention.

Figure 2 is an end elevation as observed in the direction of the arrow 2 on Figure 1.

Figure 3 is a bottom plan view of the structure of Figure 1.

Figure 4 is a side elevational view of a second embodiment of the invention.

Figure 5 is a bottom plan view of the structure of Figure 4.

At this point it is to be observed that the structures as illustrated are on a substantially enlarged scale, the embodiment of Figures 1 to 3 being approximately twice actual size, while that of Figures 3 and 4 is approximately one and one-half times actual size.

Referring now in detail to the drawing, and first to Figures 1, 2 and 3, H designates a fish hook which is of usual construction and may be varied from that illustrated, the hook including the usual shank s, terminating in an eye e at one end and the usual barb b at the other end.

The present invention relates to an attachment for the hook H, and in the embodiment of Figures 1 to 3 includes a relatively light gauge flexible wire 10 which is bent intermediate its ends in the provision of a loop 11 and which is rigidly engaged with the eye e by means of a hollow rivet 12 extending through the eye e. The wire thus bent includes a pair of strands 13 which are twisted, as at 14, and thence diverge, as at 15, from which the free ends of the strands are disposed in alinement and substantially at right angles to the shank s in the provision of a bead-supporting axle 16.

A bead 17 is diametrically apertured at 18 for freely receiving the wire axle 16, whereby the bead is rotatably supported on the wire disposed as above described.

The twist 14 in the wire acts as a spring, whereby the ends forming the axle 16 are maintained in the bead aperture 18.

The bead 17 is disposed immediately in advance of the hook barb b for effectively guarding same from catching in weeds, rocks or the like, and due to the pivotal mounting of the bead it readily rotates and rolls over any obstructions in advance of the barb.

The bead is, as shown, provided with a multiplicity of plane surfaces, and is preferably formed of glass or other light-reflecting material, whereby same simulates bait on the barb and thereby, in addition to its guarding capacity, serves to attract fish to the hook.

The hook H, in accordance with the embodiment of Figures 4 and 5, is connected by means of a rivet 20 to a spoon S.

At this point, it is to be noted that the hook according to Figures 1 to 3 may also be connected to a spoon, or the hook of Figures 4 and 5 may be used separately, as in Figures 1 to 3.

A single strand flexible wire 21 has a looped end 22 thereof rigidly connected to the spoon S by means of a hollow rivet 23. The wire 21 adjacent its opposite end is provided with a triangular loop 24 in the provision of a bead-engaging axle 25, which extends through a diametrical aperture 26 in a bead 27 for rotation thereof similarly to the bead 17. The bead 27 is shown as spherical, but may be of the form of Figures 1 to 3, and the bead 27 is preferably formed of glass, plastic or other light-reflecting material to serve as artificial bait.

The bead 27 is disposed immediately in advance of the barb b as in Figures 1 to 3, and in order to further entice fish to the hook, a second and preferably smaller bead 29 is retained on the wire 21 by means of an extension 30 from the triangular loop 24.

The beads 17 and 27, in addition to functioning as guards for the hook barbs, reflect the light and thereby act as baits or lures to attract the fish to the barbed ends of the hooks rather than to the shanks of the hooks or other parts remote from the barbed ends. This is a distinct advantage, since fish often hit high on the bait, thereby missing the hook entirely, as has been experienced with other types of hooks.

Furthermore, the beads as is shown are loosely mounted on their supporting wires, as a result of which a vibratory sound is made and which is amplified under water, thereby attracting fish to the hook.

While the invention is disclosed in operative association with a single hook, it will be understood that it is capable of use with two or more hooks.

The wire used in the flexible bead-supporting means may be a single strand, as disclosed, or of other construction within the scope of the present invention.

Thus, it will be appreciated that, with the improved attachment, the hook is baited as well as being guarded against catching in weeds or the like, and the bait functions also in the provision of an audible lure.

It will also be appreciated from the above disclosure that the invention provides a novel attachment to a fish hook which effectively guards the barb thereof while also functioning as artificial bait for luring fish to the hook.

While I have disclosed my invention in accordance with certain specific embodiments thereof, such is to be considered as illustrative only, and not restrictive, the scope of the invention being defined in the following claims.

What I claim and desire to secure by U. S. Letters Patent is:

1. In combination with a fish hook, including a shank and having a terminal eye and a hook barb, a flexible wire weed guard member having one end thereof connected to the eye, the wire member extending from the eye and terminating at a point adjacent to and in advance of the barb, the wire member including a portion extending tranversely of the shank and providing a bead-mounting axle, and a light-reflecting and refracting bead rotatably supported on said axle and disposed immediately in advance of the barb and in symmetrical relation to said shank, said wire member including a pair of strands united by a loop at said one end, twisted between the ends, and said strands diverging beyond said twists and thence extending toward each other in alinement in the formation of said axle.

2. In combination with a fish hook including a shank having a barb on one end thereof, a combined artificial bait and weed guard in the form of a relatively large bead disposed closely in advance of said barb and having a multiplicity of plane light-reflecting surfaces for attracting fish to the barb, and a flexible wire extending obliquely to said shank and having one end thereof secured to the other end of the shank, said bead being rotatably mounted on the other end of the wire, the said flexible wire providing for a vibratory movement of the bead which, together with its rotary movement and light-reflecting capacity, readily attracts fish toward same and the adjacent barb.

EDWIN C. LANE.

REFERENCES CITED

The following references are of record in the file of this patent:

UNITED STATES PATENTS

| Number | Name | Date |
| --- | --- | --- |
| 454,982 | Mack | June 30, 1891 |
| 816,130 | Shaw | Mar. 27, 1906 |
| 1,306,383 | Lindquist | June 10, 1919 |
| 1,573,553 | Klipec | Feb. 16, 1926 |
| 1,766,279 | Brown | June 24, 1930 |
| 1,822,785 | Petrie | Sept. 2, 1931 |
| 2,195,347 | Wiard | Mar. 26, 1940 |
| 2,251,593 | Mangle | Aug. 5, 1941 |